United States Patent
Chang et al.

(10) Patent No.: US 11,215,051 B2
(45) Date of Patent: Jan. 4, 2022

(54) INTELLIGENT IN-WELL STEAM MONITORING USING FIBER OPTICS

(71) Applicant: Halliburton Energy Services, Inc., Houston, TX (US)

(72) Inventors: Paul Chin Ling Chang, Cypress, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/462,605

(22) PCT Filed: Dec. 29, 2017

(86) PCT No.: PCT/US2017/068947
§ 371 (c)(1),
(2) Date: May 21, 2019

(87) PCT Pub. No.: WO2019/132979
PCT Pub. Date: Jul. 4, 2019

(65) Prior Publication Data
US 2021/0102458 A1    Apr. 8, 2021

(51) Int. Cl.
*E21B 43/24*    (2006.01)
*E21B 47/135*   (2012.01)
*G01D 5/353*    (2006.01)

(52) U.S. Cl.
CPC ............ *E21B 47/135* (2020.05); *E21B 43/24* (2013.01); *E21B 43/2406* (2013.01); *G01D 5/353* (2013.01)

(58) Field of Classification Search
CPC .................................................. E21B 43/2406
See application file for complete search history.

(56) References Cited

U.S. PATENT DOCUMENTS

| | | | |
|---|---|---|---|
| 2005/0072567 A1 | 4/2005 | Steele et al. | |
| 2011/0229071 A1* | 9/2011 | Vincelette | E21B 47/135 385/13 |
| 2014/0216732 A1 | 8/2014 | Stone et al. | |
| 2014/0222343 A1* | 8/2014 | Samson | G01V 3/12 702/8 |
| 2015/0354330 A1 | 12/2015 | Stahl et al. | |
| 2016/0237807 A1 | 8/2016 | Wilson et al. | |
| 2016/0251957 A1* | 9/2016 | McEwen-King | E21B 47/07 73/152.39 |

(Continued)

FOREIGN PATENT DOCUMENTS

| CN | 103277088 A | 9/2013 |
|---|---|---|
| CN | 203347780 U | 12/2013 |

OTHER PUBLICATIONS

Gagnon, H., et al., "Monitoring Steam-Assisted Gravity Drainage (SAGD) with EIT," *15th International Conference on Biomedical Applications of Electrical Impedance Tomography*, Apr. 2014.

(Continued)

*Primary Examiner* — Giovanna Wright
(74) *Attorney, Agent, or Firm* — Haynes and Boone, LLP

(57) ABSTRACT

In-well steam monitoring for SAGD operations using permanent fiber optic sensors installed behind the casing of an injector or producer well provides continuous monitoring of downhole steam injection. Using in-well sensor measurements, the system may also adjust or otherwise manipulate the volume of injected steam over time.

19 Claims, 12 Drawing Sheets

(56) References Cited

U.S. PATENT DOCUMENTS

2016/0369607 A1 12/2016 Roy et al.
2019/0032913 A1* 1/2019 Juranitch ............... E21B 43/24

OTHER PUBLICATIONS

International Search Report and The Written Opinion of the International Search Authority, or the Declaration, dated Sep. 19, 2018, PCT/US2017/068947, 11 pages, ISA/KR.

Nakayama, T., et al., "Monitoring an Oil-Sands Reservoir in Northwest Alberta Using Time-Lapse 3d Seismic and 3D P-SV Converted-Wave Data," *The Leading Edge*, vol. 27, No. 9, pp. 1158-1175, Sep. 2008.

Tøndel, R., et al. "Reservoir Monitoring of Steam-Assisted Gravity Drainage Using Borehole Measurements," *Geophysical Prospecting*, vol. 62, No. 4, pp. 760-778, Jul. 2014.

Zhang, W., et al., "Understanding Reservoir Architectures and Steam-Chamber Growth at Christina Lake, Alberta, by Using 4-D Seismic and Crosswell Seismic Imaging," *SPE Reservoir Evaluation & Engineering*, vol. 10, No. 5, pp. 446-452, Oct. 2007.

\* cited by examiner

INTELLIGENT IN-WELL STEAM MONITORING USING FIBER OPTICS

PRIORITY

The present application is a U.S. National Stage patent application of International Patent Application No. PCT/US2017/068947, filed on Dec. 29, 2017, the benefit of which is claimed and the disclosure of which is incorporated herein by reference in its entirety.

FIELD OF THE DISCLOSURE

The present disclosure relates generally to downhole monitoring and, more specifically, to in-well steam monitoring for Steam Assisted Gravity Drainage ("SAGD") oil production processes.

BACKGROUND

For the last several decades, the oil and gas industry has developed the SAGD method to extract heavy oil that is too viscous to be extracted using older methods. The heavy oil may also be too deep for the surface mining process. To tackle this problem, the SAGD approach uses a pair of horizontal wells to heat and extract the heavy oil. Specifically, steam is injected from the top well (injector well), which heats the oil bitumen making it less viscous; this lower viscous bitumen then flows to the bottom where it is collected and pumped to the surface by a second well (producer well). In order to maximize oil production and reduce the amount of water resources needed, steam should be spread to cover the whole region occupied by the heavy oil, but this is difficult when heterogeneity exists within the reservoir, as this can prevent steam from flowing as expected. Moreover, steam may be injected into the reservoir at different rates across the injector well, which makes its flow pattern even harder to predict. All these point towards the fact that it is necessary to monitor the steam volume over time to increase efficiency of the process.

Conventional steam monitoring methods rely heavily on seismic imaging, more specifically seismic time-lapse techniques, commonly known as 4D seismic. Although 4D seismic can be successful in many situations, it is very expensive, and it may not directly sense the steam chamber itself due to minimal changes in the reservoir's petro-elastic properties. Furthermore, the steaming process also changes the electric resistivity, which is a function of many factors such as the formation itself, steam temperature and salinity. When the change is significant, this creates a larger resistivity contrast between the steam chamber and the rest of reservoir that can be detected using the electromagnetic ("EM") surveying techniques.

The instrumentation of these EM techniques can be installed downhole to collect data and obtain time-lapse images for further processing and interpretation. One such technique is to obtain an electrical resistivity tomography ("ERT") survey using two borehole observation wells and produce a mapping of resistivity changes due to steam chamber growth. Currently, these types of cross-well ERT, coupled with 2D or 3D inversions are the general state of practice.

However, one setback of the cross-well ERT method is that it requires additional observation wells, which may or may not be allowed in a field operation. While it costs much more to drill additional observation wells, deciding where and how to drill them is also challenging tasks themselves because such decisions will greatly affect monitoring performance. Moreover, from the standpoint of system reliability, it is certainly not desirable to have a steam monitoring system that depends on the observation wells.

Besides cross-well ERT, others have written on placing ERT electrodes downhole to image the reservoir, measure whether conditions are heterogeneous, and how the steam chamber evolves as oil is extracted. However, these papers do not provide any information on how these ideas can be realized in practice under the hostile downhole environment. In addition, note that one important concern with monitoring steam movement with conventional ERT images is that it requires many sensors collecting measurements from all surrounding spatial angles in order to produce a good quality image of the target. If sensors are distributed unevenly across the surrounding space, the resolution will suffer in some directions. This is the inherent limitation of all Fourier-based image reconstruction. As a result, a conventional ERT system demands many more sensors, which is also the reason why additional observation wells are necessary for these cross-well ERT systems.

DESCRIPTION OF ILLUSTRATIVE EMBODIMENTS

Figure 1A:
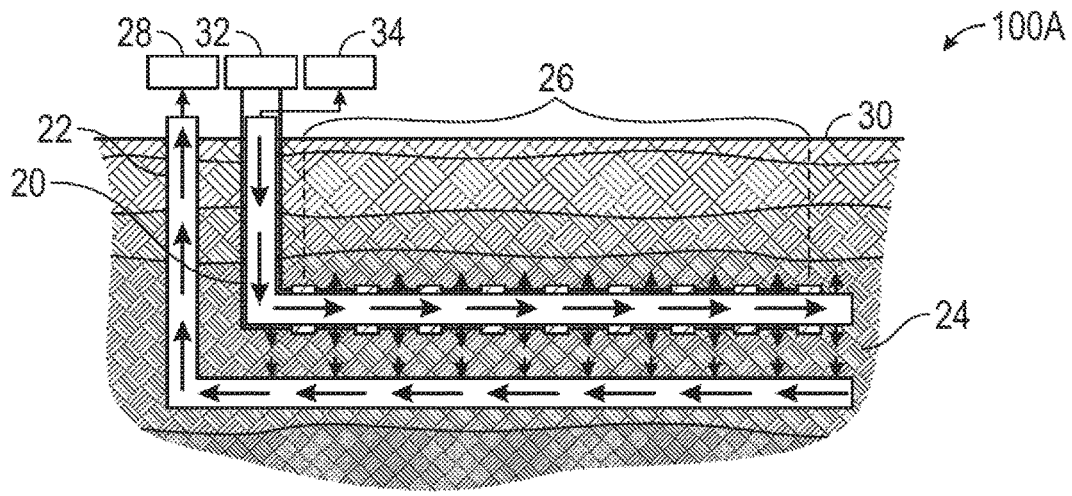
FIGS. 1A, 1B, and 1C illustrate various configurations of in-well steam monitoring systems, according to illustrative embodiments of the present disclosure.

Illustrative embodiments and related methods of the present disclosure are described below as they might be employed for in-well steam monitoring of SAGD operations. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure describe in-well steam monitoring for SAGD operations using fiber optic sensors. A generalized monitoring system includes an injector extending along a hydrocarbon-bearing formation which injects steam into the formation surrounding the injector well. A producer well is also positioned along the formation adjacent the injector well in order to produce the hydrocarbons released by the injected steam. One or more fiber optic sensors are placed along the injector and/or producer wells. An optical control system is communicably coupled to the fiber optic sensors to monitor the injected steam. During operation, the injected steam causes physical perturbations in the formation which, in turn, induces strain on the fiber optic sensor. The fiber optic sensor then transmits a corresponding light signal to the optical control system, which is then processed as an in-well measurement. Accordingly, the optical control system may then monitor and control the level of injected steam based upon the in-well measurements.

Motivated by the need to maximize oil production of SAGD process in the most cost-efficient way, the illustrative embodiments of the present disclosure propose several in-well steam monitoring configurations using both galvanic or induction EM sensors. More specifically, these sensing configurations are electric bi-pole configuration, casing source configuration, and induction coil configuration. In all of these sensing configurations, the described method of the in-well steam monitoring is to install sensors permanently on the injector and producer wells to provide continuous monitoring of the steam chamber. Typically, however, such a system would require placement of complex electronics in the hostile downhole environment where high temperature and pressure increases the likelihood of systemic failure. To address this, the present disclosure makes use of the low signal and power loss characteristics of fiber optics and moves the complex systems of power supply, signal detection, and communication telemetry to the surface, thereby leaving only the electronics-free sensors downhole; this results in lower cost and a more reliable sensor system which can better withstand the hostile downhole environment for extended periods of time. Accordingly, the optical-based EM sensors described herein may be deployed permanently behind the casing for the life of the well to monitor and control steam progression over time.

Figure 1B:
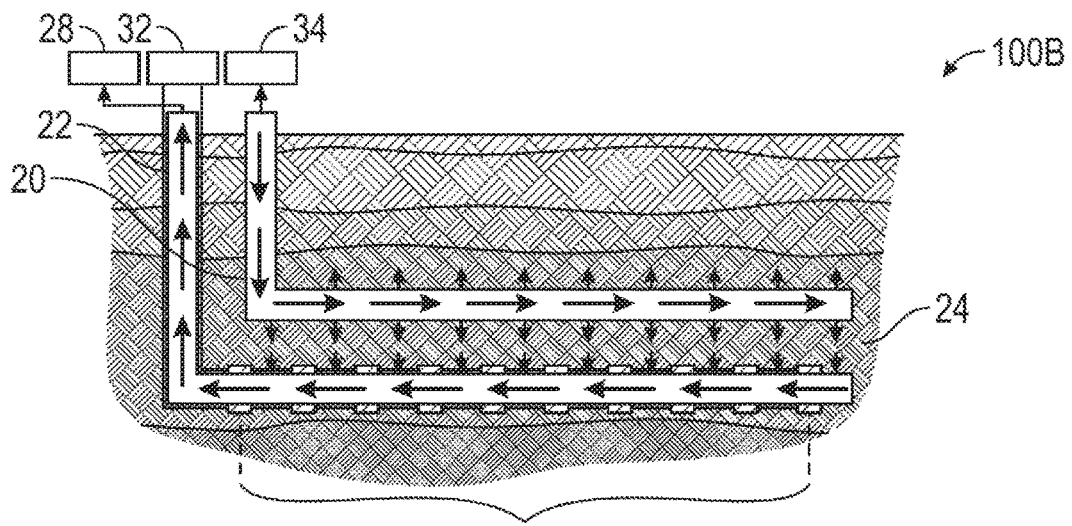
Figure 1C:
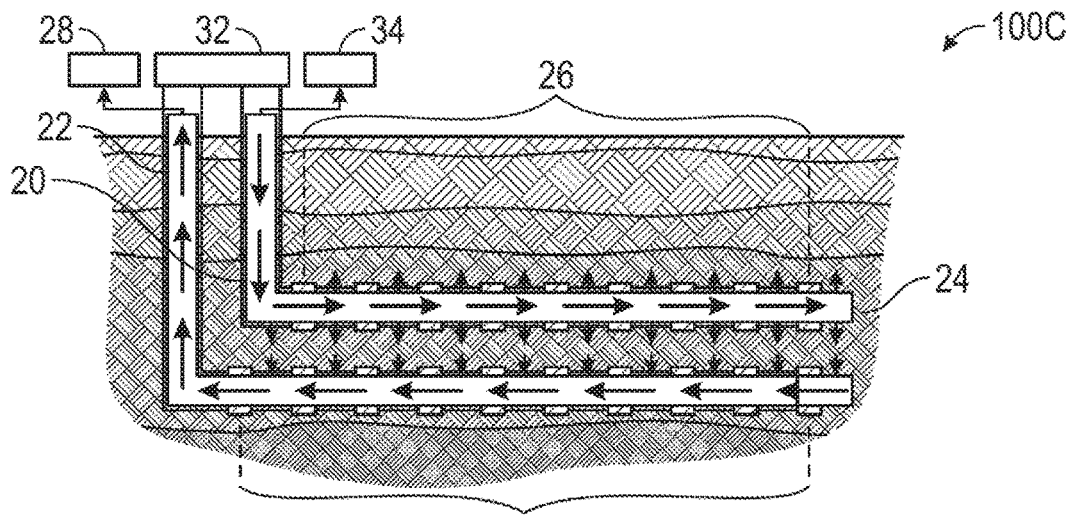

FIGS. 1A, 1B, and 1C illustrate various configurations of in-well steam monitoring systems, according to illustrative embodiments of the present disclosure. In FIGS. 1A-1C, each shows an injector well 20 and producer (or in-fill) well 22 extending along a hydrocarbon-bearing formation 24. FIG. 1A shows in-well monitoring system 100A having electronics-free fiber optic sensor 26 positioned along injector well 20. As used herein, "electronics-free" means the circuitry necessary for power supply, signal detection, and communication are located at the surface. Although certain illustrative embodiments may also include portions or all of this circuitry downhole as well. As will be described in more detail below, fiber optic sensor 26 includes a plurality of sensors positioned axially along the specified tubular to which it is attached.

Producer well 22 is connected to a crude oil extractor 28 located at surface 30. An optical control system 32, positioned at surface 30, is communicably coupled to fiber optic system 26, and includes the necessary circuitry and components to provide power, telemetry and signal processing functions for the in-well measurements transmitted by fiber optic sensor 26. Steam generator 34 is also positioned at surface 30, and is coupled to injector well 20 in order to provide steam injection along formation 24. Although not shown, in certain illustrative embodiments, optical control system 32 may be communicably coupled to crude oil extractor 28 and steam generator 34 in order to adjust the volume of hydrocarbons produced and/or steam injected into formation 24.

FIG. 1B shows in-well monitoring system 100B having electronics-free fiber optic sensor 26 positioned along producer well 22, and optical control system 32 is communicably coupled accordingly. FIG. 1C shows in-well monitoring system 100C having electronics-free fiber optic sensor 26 positioned along both injector well 20 and producer well 22. Again, optical control system 32 is communicably coupled to fiber optic sensors 26 accordingly.

Optical control system 32 is the control center of the intelligent monitoring systems describes herein. Optical control system 32 includes the storage/communication circuitry necessary to perform the methods described herein. In certain embodiments, that circuitry is communicably coupled to fiber optic sensors 26 in order to process the received in-well measurements. Optical control system 32 includes at least one processor and a non-transitory and computer-readable storage, all interconnected via a system bus. Software instructions executable by the system control center for implementing the illustrative relative positioning methods described herein in may be stored in local storage or some other computer-readable medium. It will also be recognized the steam monitoring software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

As opposed to conventional cross-well steam monitoring where observation wells are introduced to help monitor the steam chamber, the in-well steam monitoring of the present disclosure relies only on sensors placed directly on the injector and/or producer wells. As illustrated in the examples of FIGS. 1A-1C, this may include placing fiber optic sensors 26 on either the injector or producer wells or both. In certain other embodiments, this may also include positioning fiber optic sensors 26 on the in-fill wells drilled amongst existing SAGD wells for steam injection or oil production purposes. Comparing the present disclosure to conventional cross-well steam monitoring, in-well steam monitoring is advantageous as it does not require drilling additional observation wells. Moreover, the present disclosure provides more overall benefits as compared to conventional applications because the injector and producer wells (and sensors) are right where the steam needs to be monitored, and with carefully-designed sensor configurations, the monitoring performance is very good.

The intent of the described in-well steam monitoring is to install fiber optic sensors permanently on the injector and producer wells to monitor the steam chamber continuously. However, as previously mentioned, this typically would require running complex electronics in the hostile downhole environment with its associated high temperature and pressure. Under these conditions, such electronics would be prone to failure. As a result, the remedy would be to invest more money on shielding these electronics. However, embodiments of the present disclosure overcome this deficiency by providing an entirely electronics-free downhole design through the use of fiber optics. In the described fiber-optic sensor/receiver system, any physical perturbation of the environment interacts with the fiber (or, e.g., transducer attached to the fiber, also referred to herein as a strain-responsive light modulator) to directly modulate the light traveling through it. This modulated signal then travels back along the same fiber to a signal interrogation system (i.e., optical control system 32) at the surface where the signal is extracted and the corresponding perturbation is determined. Therefore, by integrating fiber optics into an in-well monitoring system, all the complex electronics such as, for example, power supply, signal processing, and communication telemetry may be moved to the surface, leaving only the electronics-free fiber sensors and transmitters downhole. The resulting fiber optic EM sensor therefore more suitable in the downhole environment and can be deployed permanently behind the casing for the life of the well.

As will be described in detail below, the present disclosure describes three illustrative types of sensing configurations that incorporate fiber-optic sensors. These illustrative configurations include an electric bi-pole configuration, casing source configuration, and induction coil configuration. In order to monitor steam movement, the goal of these configurations is to detect changes in the reservoir over time by measuring the resistivity contrasts caused by the injected steam.

Figure 2:
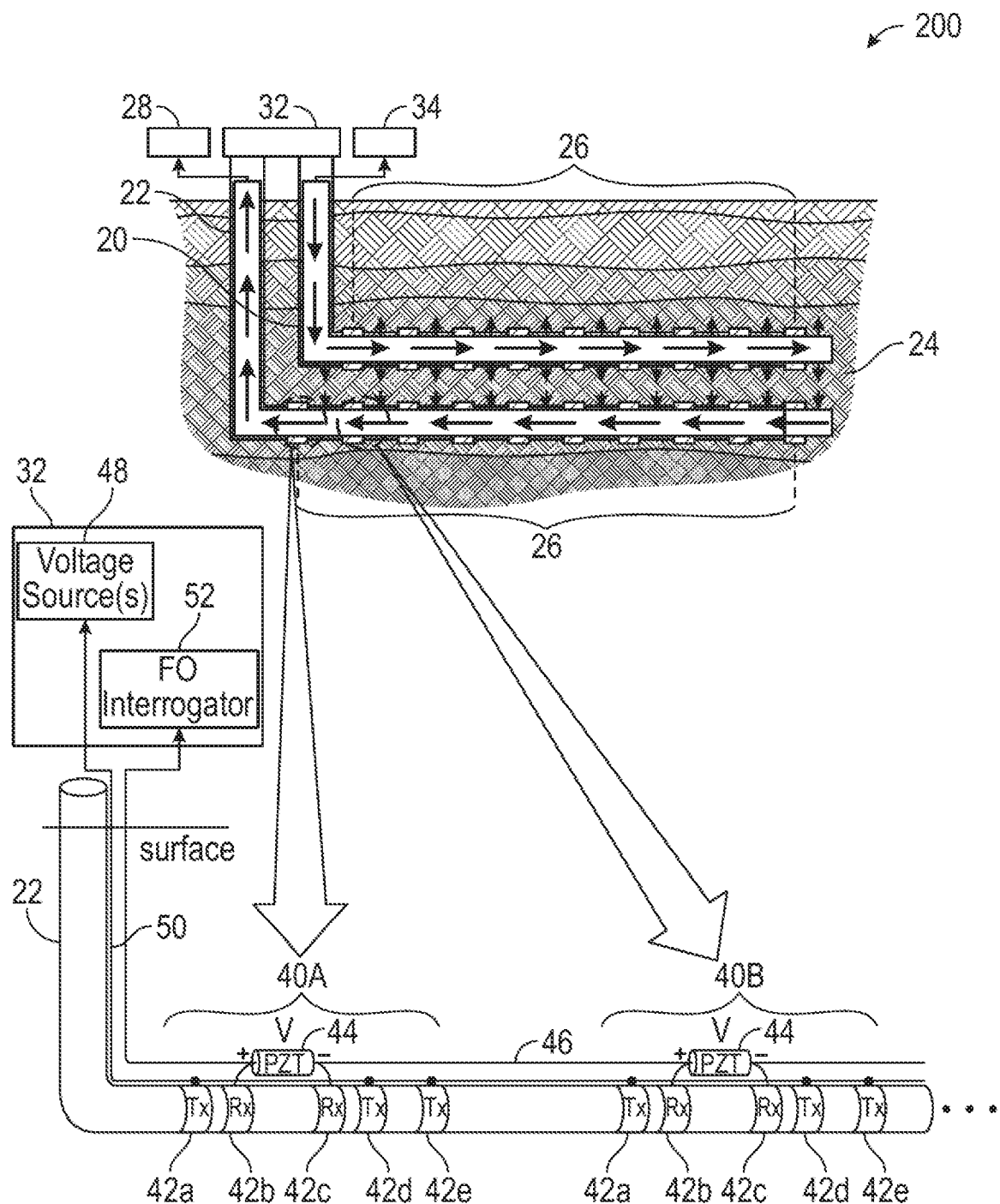
FIG. 2 illustrates an electric bi-pole sensing configuration, according to certain illustrative embodiments of the present disclosure.

FIG. 2 illustrates an electric bi-pole sensing configuration, according to certain illustrative embodiments of the present disclosure. FIG. 1C has been reproduced in the upper half of FIG. 2 for ease of understanding. As shown in the lower half of FIG. 2, fiber optic sensor 26 includes a plurality of sensor sets 40A-N axially spaced from one another along the tubular, with sensor sets 40A and 40B being shown. In this example, sensor sets 40A and 40B each consists of five metal electrodes 42a-e placed around the casing of producer well 22 and a fiber optic sensor package comprised of strain-responsive light modulator 44 and fiber optic cable 46.

In certain illustrative embodiments, these five metal electrodes will be of ring shape that can easily fit through and be attached to the casing, and the casing for this configuration is an insulated casing (e.g., pipes with insulated coatings to prevent rusting in the harsh downhole environment). Among these five metal plate electrodes, three are used as transmitting electrodes (42a, 42d, and 42e) and two as receiving electrodes (42b and 42c), each being axially spaced from one another along producer well 22. The two receiving electrodes 42b and 42c will be placed in between transmitting electrodes 42a and 42d. Such arrangement excites voltages through source electrode 42a, return electrode 42e (forming a leftmost-rightmost Tx pair (main)), and optional bucking electrode 42d (forming a middle-rightmost Tx electrode pair (bucking)), and measures the voltage difference between the Rx (receiving) electrodes 42b and 42c.

In certain illustrative embodiments, the excitation through 42d and 42e is used as the bucking to cancel the direct signal from the main pair (42a and 42e) and improve the resulting signal's dynamic range in the processing. Consequently, middle electrode 42d is referred as the "bucking electrode". In order to cancel the direct signal, voltage excitation between the bucking pair is adjusted accordingly to obstruct the current path of the main pair to the point that there is no horizontal current flow (or zero voltage) between the two receiving electrodes 42b and 42c, and this needs to be done before steam is injected into the formation.

Moreover, because AC voltages are being excited, two different voltage sources should not be used as the phase mismatch will make bucking impossible. For that, the remedy is to connect a single voltage source 48 to the main pair 42a and 42e directly and the bucking pair 42d and 42e through a non-inverting amplifier (not shown) via power line 50. The non-inverting amplifier is used because the bucking voltage is expected to be slightly larger (on the order of mV) and have the same sign as the main voltage. In this example, strain-responsive light modulator 44 is connected to receiving electrodes 42b and 42c and will be used to measure the voltage between receiving electrodes 42b and 42c. A variety of different fiber optic sensors, such as a PZT (Lead Zirconate Titantate) sensor, Lithium Niobate sensor, or Terfenol D sensor may be utilized as strain-responsive light modulator 44. Each example is based on similar operational principles in which the voltage difference across the receiver electrodes causes strain in the material. This strain, which is proportional to the signal strength, causes modulation of the optical phase light in fiber optic cable 46 (which is attached to modulator 44) and can therefore be reversely determined using fiber optic interrogator 52. The emphasis here is that all in-well sensors are connected to the surface through appropriate fiber optic cables and power lines while all the power, processing, and telemetry electronics are placed only at the surface.

Figure 3A:
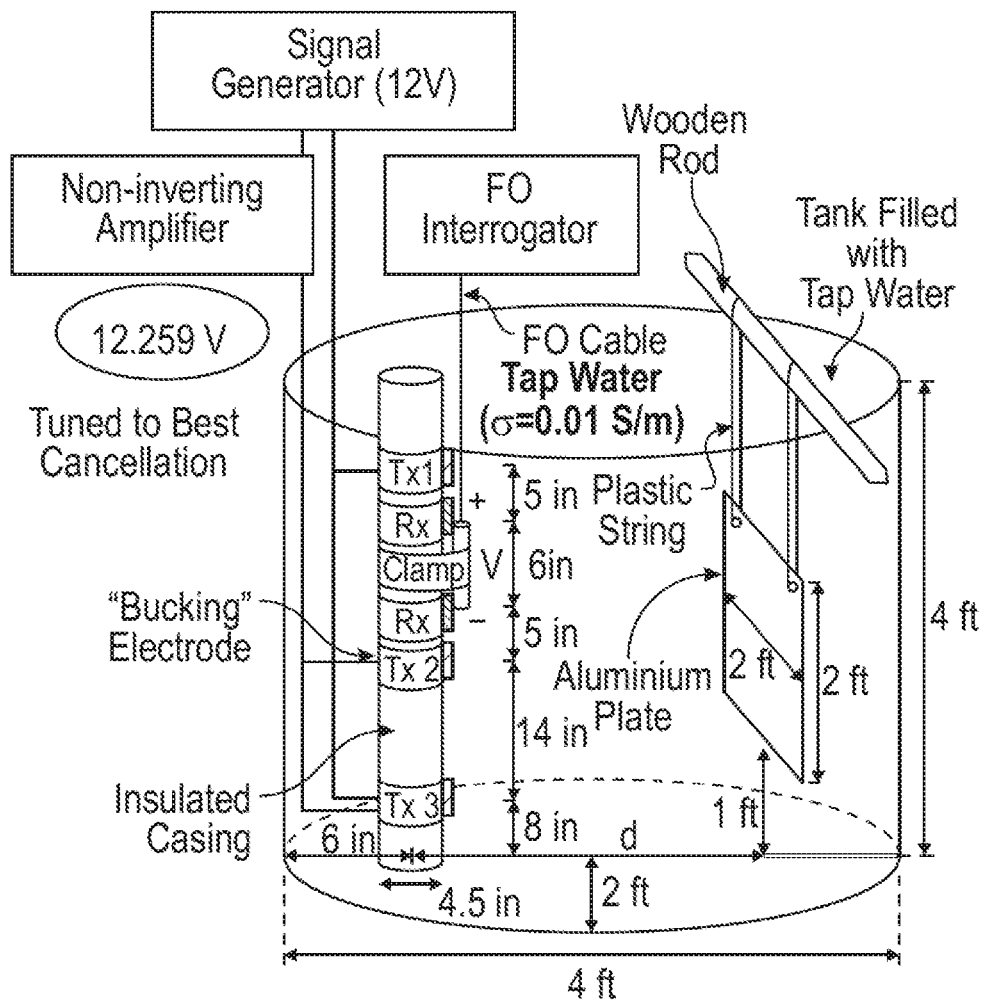
FIGS. 3A and 3B jointly illustrate a numerical water tank simulation for an electric bi-pole sensing configuration.
Figure 3A:
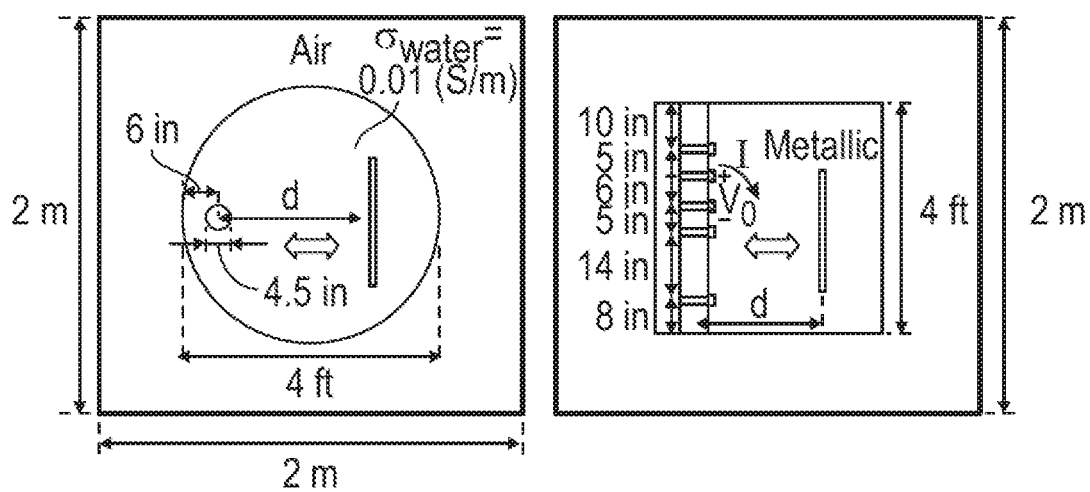
Figure 3B:
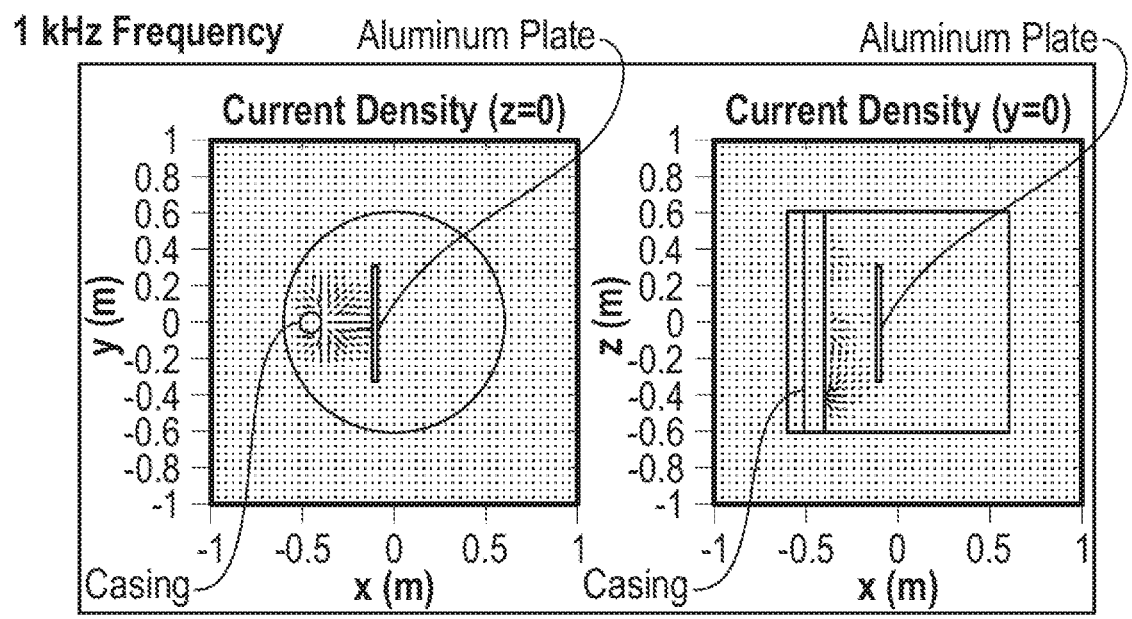
Figure 3B:
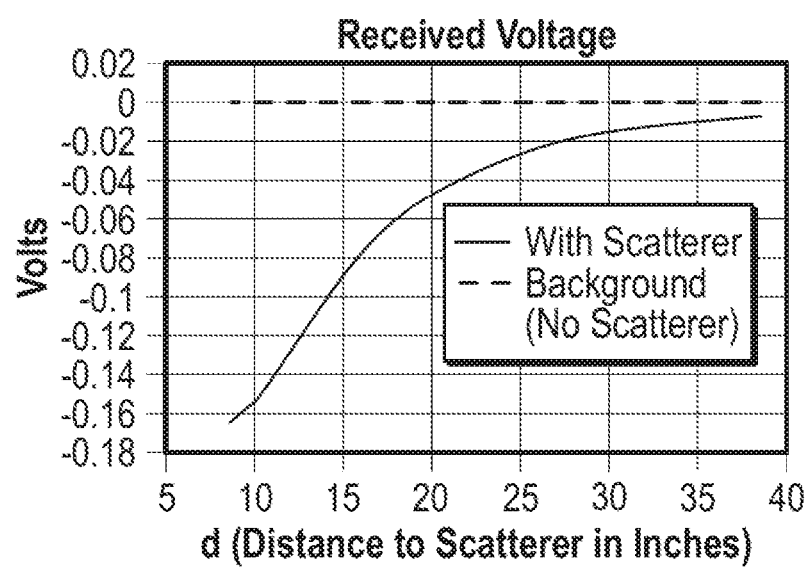

To demonstrate the validity of the illustrative electric bi-pole configuration for steam monitoring, a numerical water tank simulation is constructed as shown in FIGS. 3A and 3B. Here, in FIG. 3A, a water tank filled with tap water is used to represent the reservoir while the approaching 2 feet×2 feet×2 mm aluminum plate creates a conductivity contrast emulating the growing steam chamber. Other than rotating everything by 90° clockwise for better visualization, the arrangement of the electric bi-pole configuration is the same as that illustrated in FIG. 2. Also, injector and producer wells have a typical separation of 5-6 meters, which is not too different from the separation between metal plate and pipe. In the illustrated simulation, a 30-feet separation between the top and bottom transmitter electrodes with a 12V voltage excitation at 1 kHz is assumed, as shown in FIG. 3A. For that, the bucking voltage here is determined to be around 12.259V. One can see from FIG. 3B the received voltage decreases significantly with the approaching metal plate. This is because the metal plate has a higher conductivity that draws current away from its original path. Such signal change can be exploited in an inversion to determine the steamfront position in a reservoir.

Figure 4:
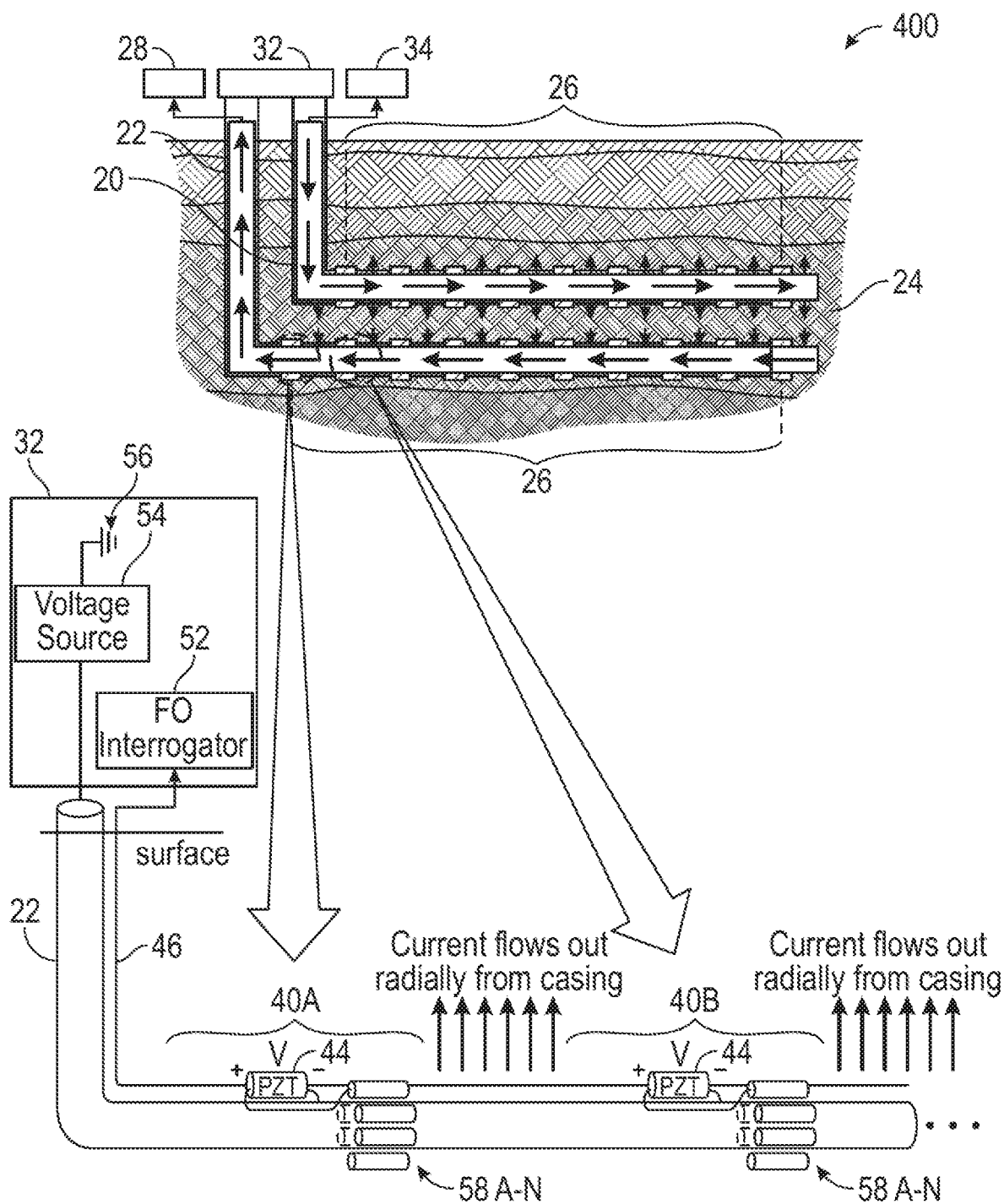
FIG. 4 illustrates a casing source configuration for in-well steam monitoring, according to certain illustrative embodiments of the present disclosure.

FIG. 4 illustrates a casing source configuration for in-well steam monitoring, according to certain illustrative embodiments of the present disclosure. The illustrated embodiment is similar to that of FIG. 2, as the same components are numbered alike. However, in this configuration, a metal casing (for producer well 22) is used as a source to inject current directly into the reservoir, and this is accomplished by applying a source voltage 54 between the casing and current return poles 56 at the surface. Ideally, these current return poles should be distributed far away and evenly around the casing so that currents flow out evenly in all radial directions.

To detect incoming steam, sensor sets 40A and 40B of FIG. 4 include receiver electrodes 58A-N which are circumferentially installed around the casing where strain-responsive light modulator 44 can be used to measure the voltage between the casing and any one of electrodes 58A-N. In this example, electrodes 58A-N are metal rod electrodes. Therefore, each in-well sensor set package on the casing consists of a collection of these receiver electrodes 58A-N placed circumferentially around the casing along with strain-responsive light modulator 44 and fiber optic cable 46. Voltage measurements between receiver electrodes 58A-N that are symmetric with respect to the casing of well 22 are processed together by optical control system 32 to mitigate the impact of the direct signal. One strain-responsive light modulator 44 and one fiber cable are included for each fiber optic sensor set. In this example, strain-responsive light modulator 44 measures the voltage between the metal casing of well 22 and any one of electrodes 58A-N and couples to the surface via fiber optic cable 46.

Figure 5A:
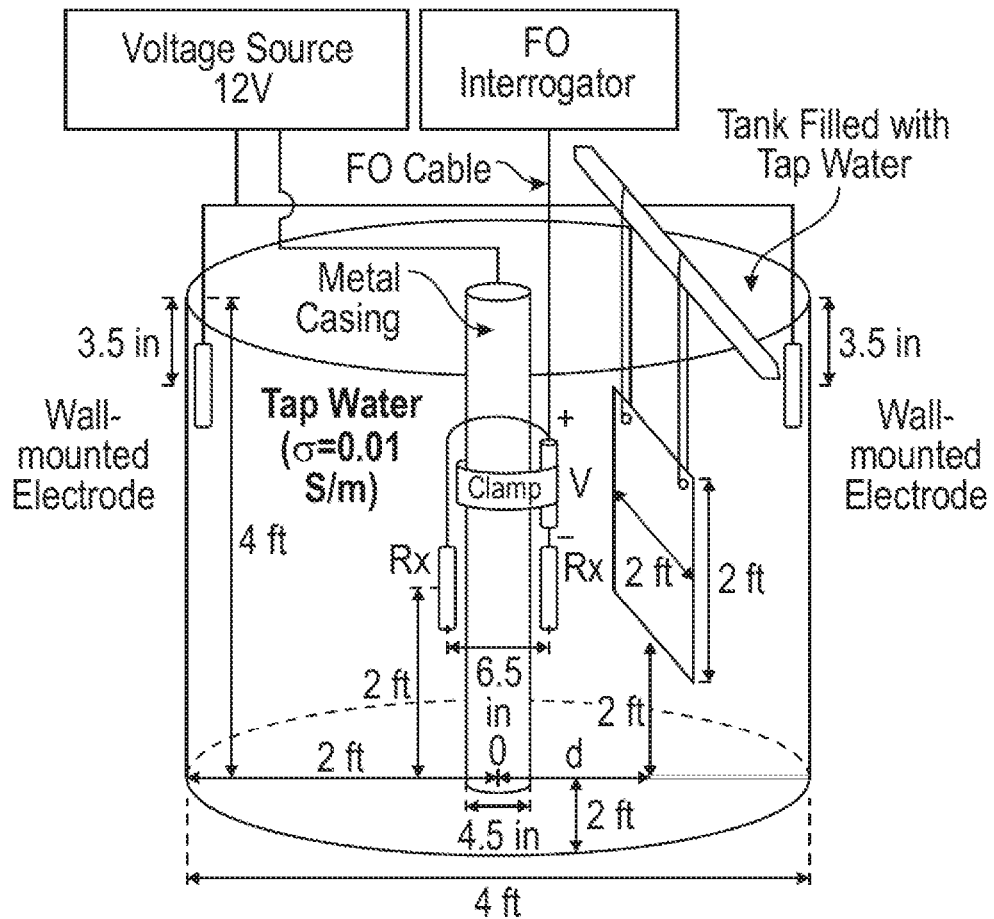
FIGS. 5A and 5B jointly illustrate a numerical water tank simulation for a casing source sensing configuration.
Figure 5A:
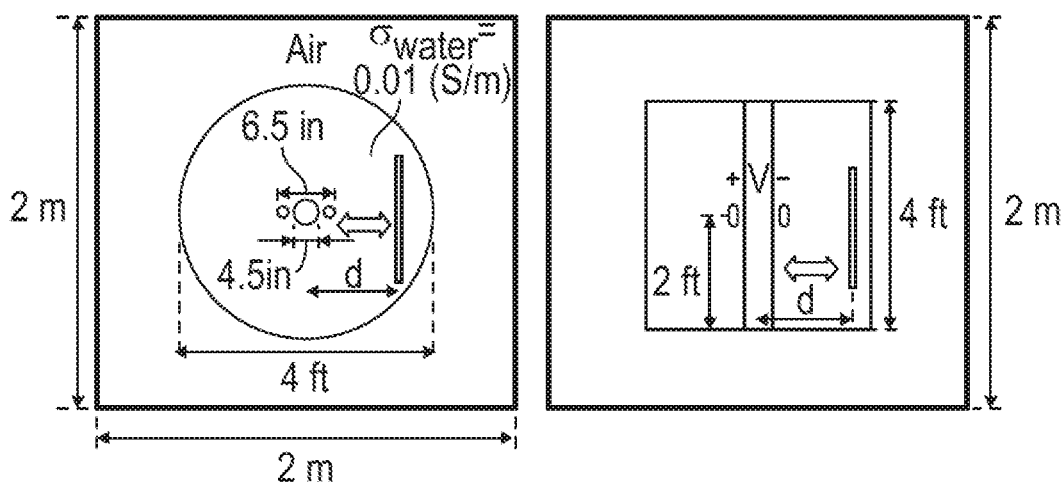
Figure 5B:
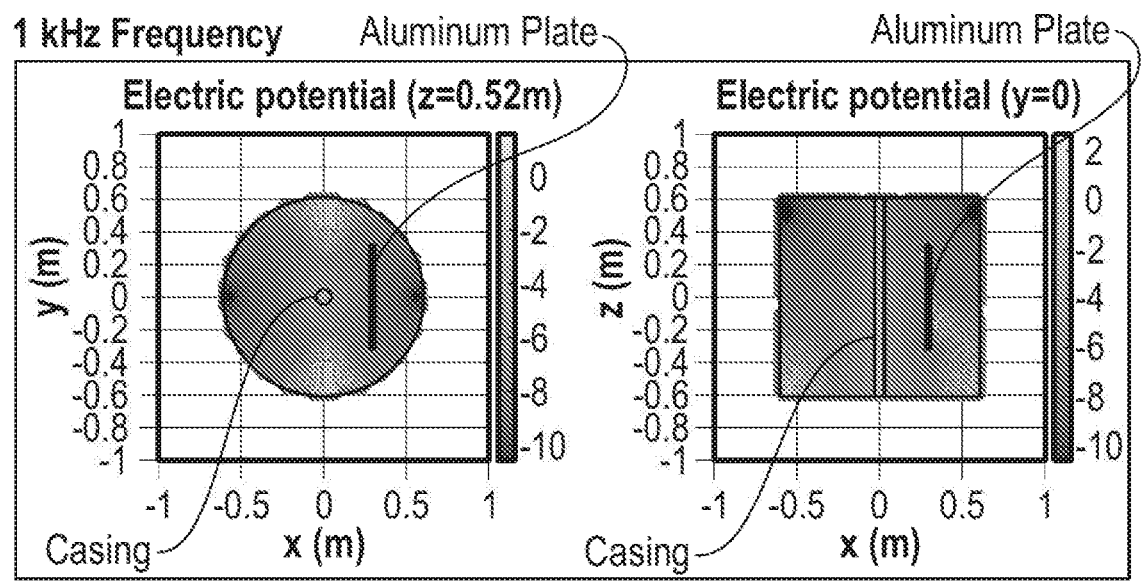
Figure 5B:
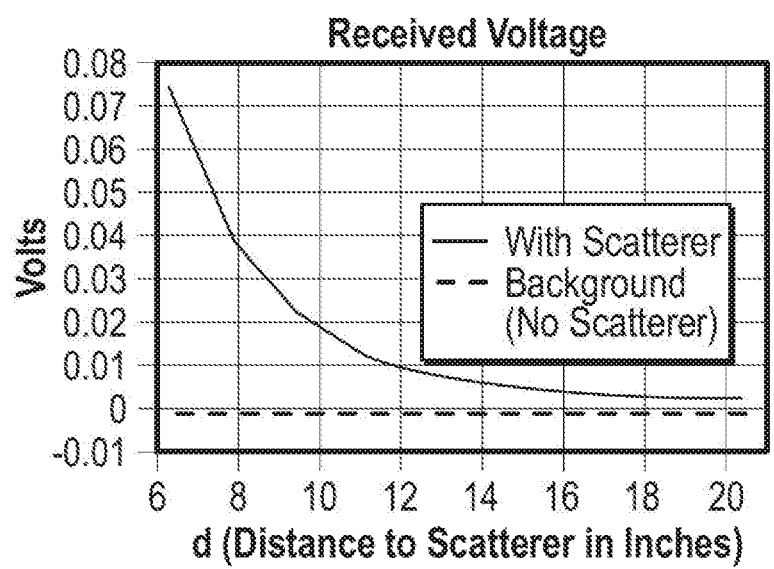

A similar water tank numerical simulation is carried out for verifying the concept of casing source configuration as shown in FIGS. 5A and 5B. Here, the water tank and metal plate have the same dimensions as those of FIGS. 3A and 3B. However, instead of using an insulated casing (as in the bi-pole case of FIGS. 3A and 3B), a metal casing will be installed at the center of the tank and be used as a source to inject current directly. To establish the current path, two identical rod electrodes shorting together with metal wire will be attached to two opposite sides of the tank. Upon applying a source voltage of 12V between the casing (+) and rod electrodes (−) at 1 kHz, currents are expected to flow out radially from the casing and return evenly to the two rod electrodes. In this setup, two receiver electrodes are installed symmetrically to opposite sides of the casing, and the voltage across these two electrodes will be measured, as shown in FIG. 5A. Due to symmetry of the electrodes, this measurement would have minimal direct signal and should be sensitive to any resistivity changes in the environment. From the electric potential plots of FIG. 5B, one can clearly see that casing source current path is working as expected and that the received voltage increases substantially with the approaching metal scatterer.

Figure 6:
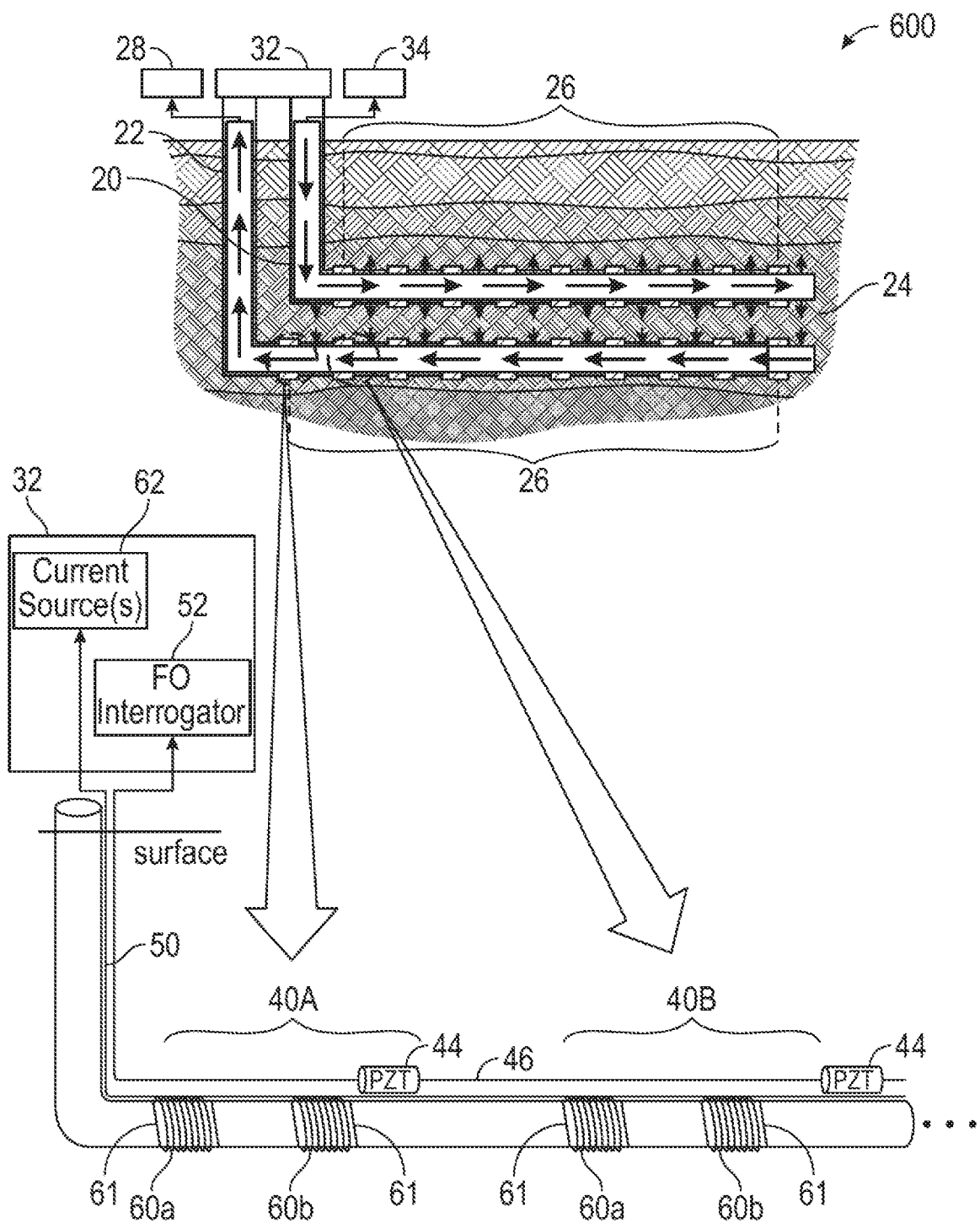
FIG. 6 illustrates an induction coil sensing configuration for in-well steam monitoring, according to certain illustrative embodiments of the present disclosure.

The third sensing configuration of the present disclosure is the induction coil configuration, as shown in FIG. 6. As suggested by the name, the principle of operation for this configuration is induction generated by sensor sets 40A and 40B. It involves a transmitter coil 60a, powered via power line 50 and current source 62, emitting magnetic energy that induces currents in the surrounding formation. These induced currents in the formation then produce secondary magnetic field and some of which will be captured by a receiver (strain-responsive light modulator 44). Consequently, the received signal would reflect any property changes in the formation, and can therefore be useful in monitoring the steam progression. In this proposed setup, each in-well fiber optic sensor set 40A,B would include one transmitter coil 60a and one bucking coil 60b to cancel the direct signal. In this example, bucking coil 60b is positioned between transmitter coil 60a and strain-responsive light modulator 44.

Figure 7:
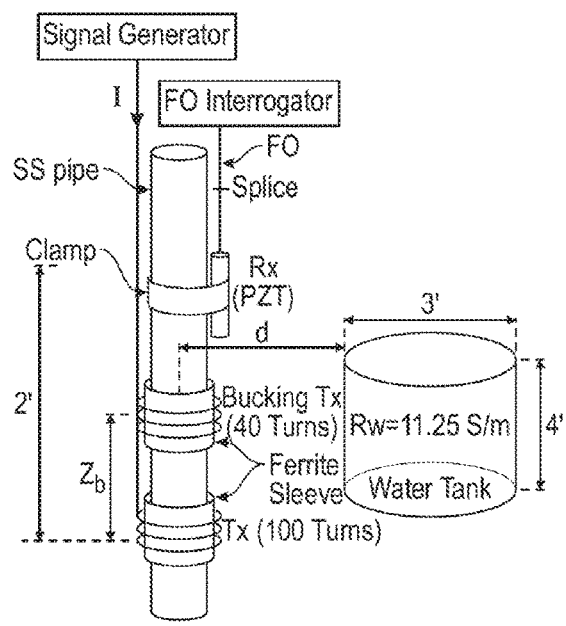
FIG. 7 is a numerical water tank simulation for an induction coil sensing configuration.
Figure 7:
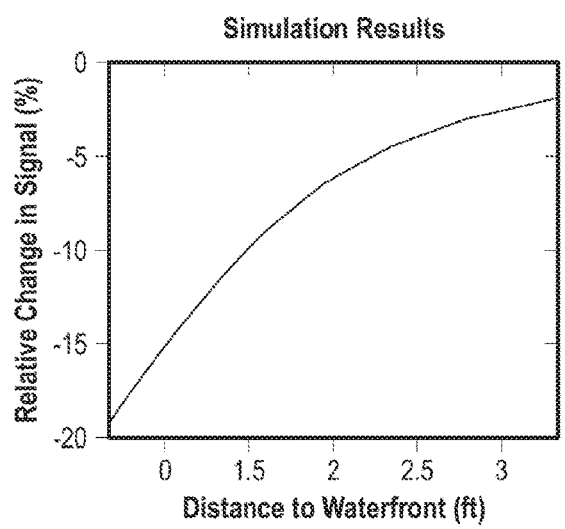

A ferrite sleeve is positioned underneath transmitter coil 60a and bucking coil 60b in order to enhance magnetic flux. In addition, strain-responsive light modulator 44 is used as the receiver to capture the magnetic field directly which, in turn, induces a strain therein and modulates the light signal traveling along fiber optic cable 46. Again, to demonstrate validity of the induction coil configuration, a numerical simulation involving sensing an approaching cylindrical-shape target is carried out and its setup is shown in FIG. 7. In FIG. 7, the cylindrical-shape target is designed to be a water tank that creates a resistivity contrast with air (where the sensing coil is located) similar to the resistivity contrast between the injected steam and hydrocarbon: both going from lower to higher resistivity. Therefore, by moving the water tank towards the sensor, it emulates the approaching steam. From the received signal, one can clearly see that the sensing coils are very sensitive to the approaching water tank target.

It should be mentioned that the proposed steam monitoring methods and configurations should not be limited to any single type of SAGD well pattern. The embodiments disclosed herein are equally applicable to any SAGD well pattern including, but not limited to the conventional parallel patterns or the more complex fishbone patterns.

Figure 8:
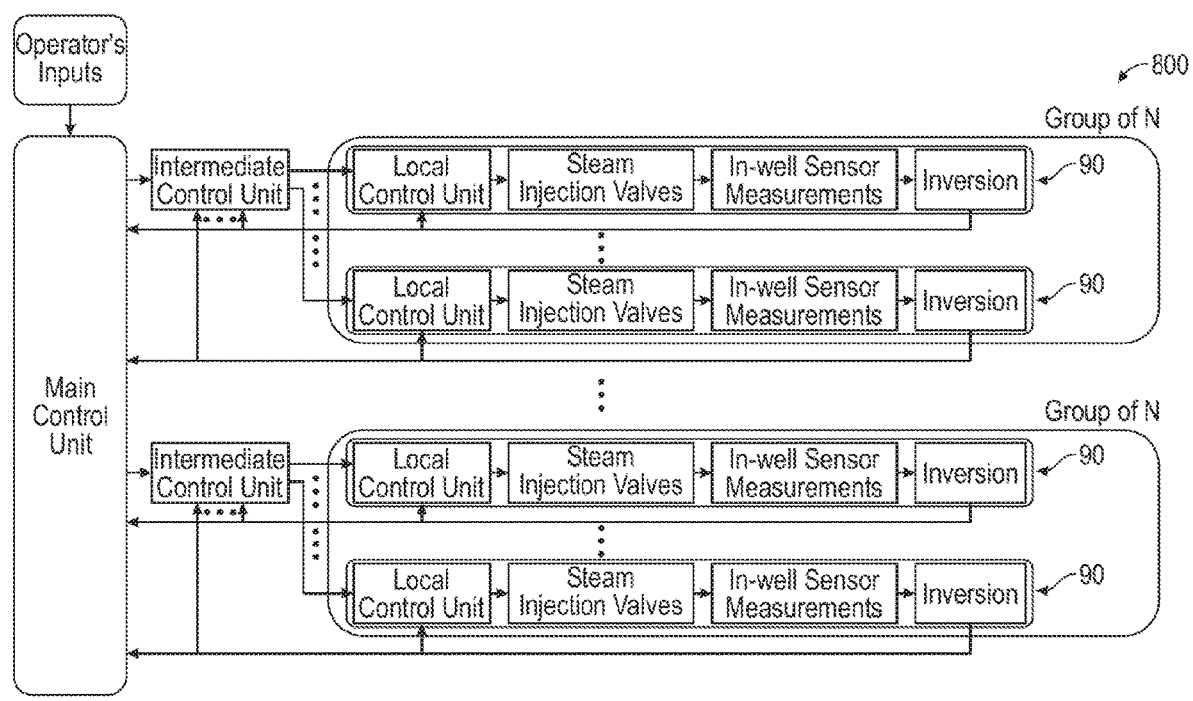
FIG. 8 is a block diagram of an intelligent SAGD steam monitoring system with multilayered feedback controls to the steam injection valves, according to certain illustrative embodiments of the present disclosure.

FIG. 8 is a flow diagram of an intelligent SAGD steam monitoring system 800 with multilayered feedback controls to the steam injection valves, according to certain illustrative embodiments of the present disclosure. Such multilayered feedback control processes are controlled by optical control system 32. The idea of this steam monitoring method is to use the measurements from individual in-well sensors as feedbacks to control the volume of steam injection from the local level and/or all the way to the global level. In certain illustrative methods, the control at the local level may involve just a few valves of a single well, as opposed to the whole well and multiple wells in the intermediate and global levels.

Still referring to FIG. 8, the system starts with inversion processing of measurements from individual in-well sensors separately to produce inversion outputs that may include distance to steamfront and resistivities of both the steam chamber and oil reservoir near each sensor. The information from each in-well sensor can then be combined and communicated to different levels of steam injection control units to exercise appropriate actions either automatically or manually via the steam injection valves. For example, FIG. 8 shows two groups of N number of injector/producer SAGD pairs 90 having N number of fiber optic sensors positioned thereon. Each individual well may correspond to a local control unit, while groups of N wells may correspond to intermediate control units, which may all be controlled by a main control unit. In certain illustrative embodiments, each referenced controlled unit may be located within fiber optic control system 32 (not shown) or, alternatively, at other locations at the surface. Accordingly, optical control system 32 monitors and controls the steam injection system and valves via the main, intermediate, and local control units.

Figure 9A:
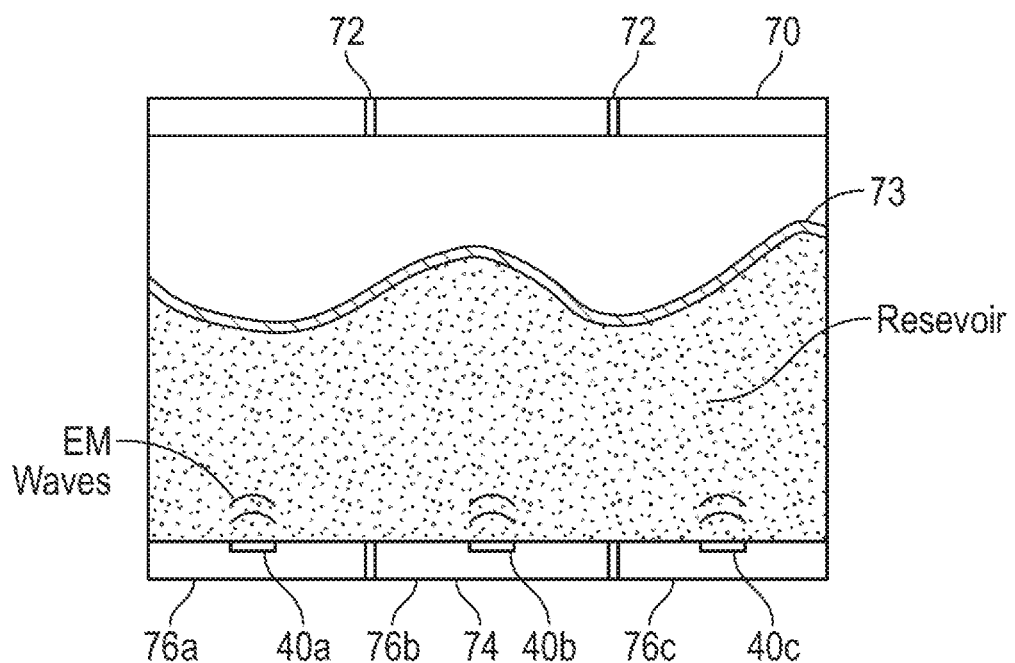
FIG. 9A illustrates local in-well steam monitoring between an injector and producer well pair, according to certain illustrative methods of the present disclosure.

FIG. 9A illustrates local monitoring between an injector and producer well pair using the feedback control of FIG. 8. Here, an injector well 70 is shown have two packers 72 positioned axially along it. Injector well 70 is shown producing a steam chamber 73 there around. A producer well 74 is shown having three compartments 76a, b, and c, each having a permanent sensor set 40A, B, or C positioned behind the casing. Using the in-well measurements obtained by sensors at each compartment 76a-c, optical control system 32 monitors and adjusts, if necessary, the steam injected by well 70. As described herein, steam from chamber 73 is sensed by fiber optic sensor sets 40A-C, whereby in-well measurement signals are transmitted uphole to the optical control system 32 (not shown), which then utilizes those signals to monitor and/or adjust the volume of injected steam.

Figure 9B:
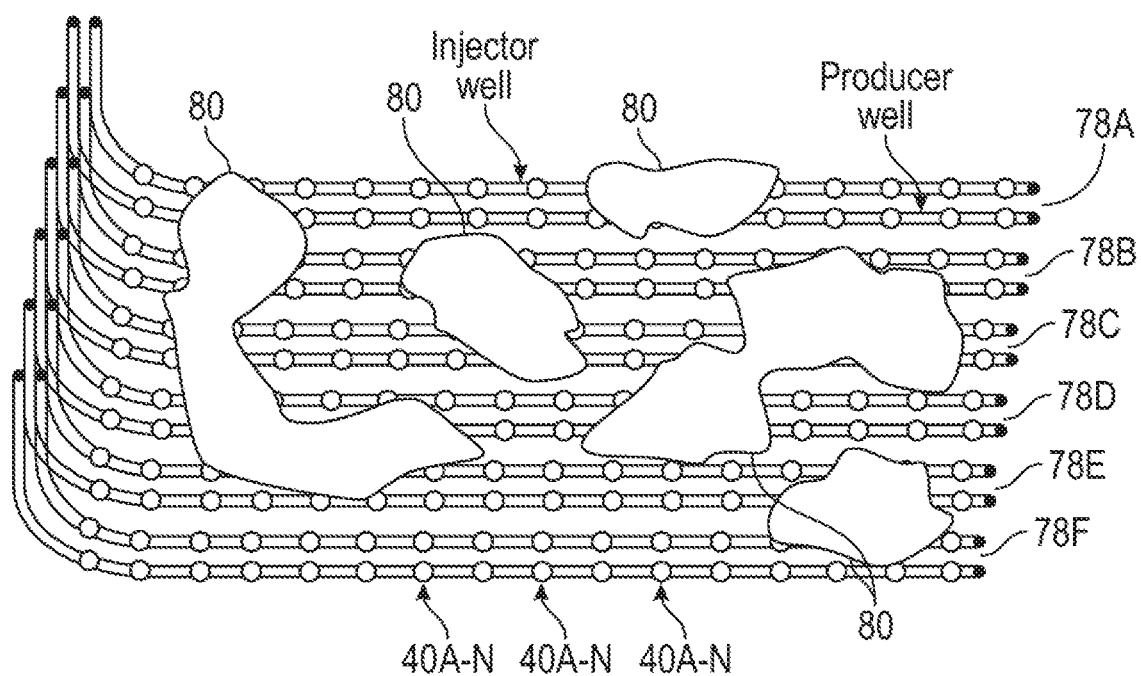
FIG. 9B illustrates global in-well steam monitoring between various cross well pairs, according to certain illustrative methods of the present disclosure.

FIG. 9B illustrates global monitoring between various cross well pairs using the feedback control of FIG. 8. Here a number of injector and producer well pairs 78A-F are positioned within a reservoir. A number of steam clouds 80 are dispersed through the reservoir, caused by steam injection from the injector wells. In this embodiment, fiber optic sensor sets 40A-N are positioned along both the injector and producer wells for increased resolution. As the steam is sensed by sensor sets 40A-N, all the in-well measurements may then be processed by the optical control system (not shown) to produce a global picture of the reservoir, which may then be used to adjust the volume of steam throughout the reservoir, as desired.

Figure 10:
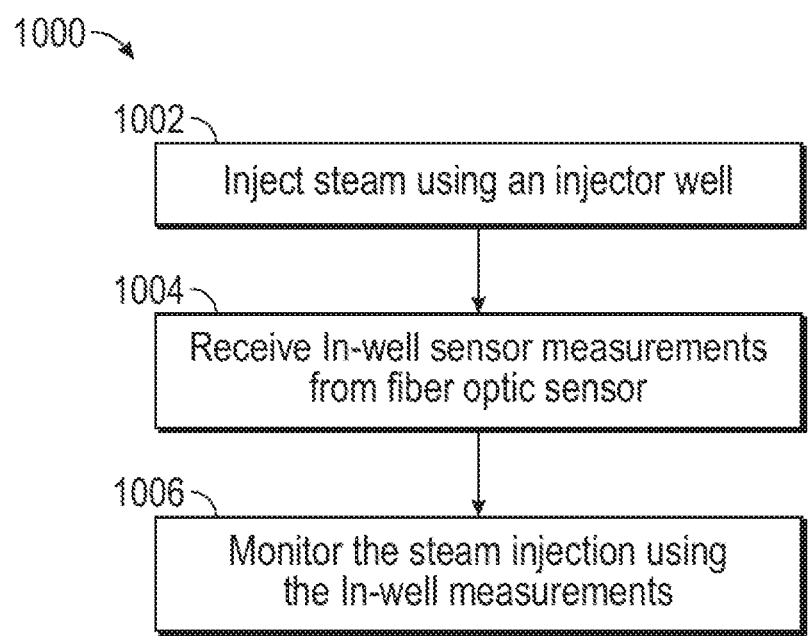
FIG. 10 is a flow chart of a method for in-well steam monitoring, according to certain illustrative methods of the present disclosure.

FIG. 10 is a flow chart of a method for in-well steam monitoring, according to certain illustrative methods of the present disclosure. To perform the illustrative method, any of the in-well steam monitoring systems described herein may be utilized. With reference to FIG. 1A-2, 4 or 6, at block 1002 of method 1000, optical control system 32 initiates steam generator 34 to begin injecting steam into injector well 20 and out into formation 24 via one or more valves positioned along injector well 20. As the steam is released, it forms a steam chamber around injector well 20 which results in the release of hydrocarbons from formation 24 and into producer well 22. At the same time, the steam cloud effects a change in the resistivity of formation 24, which is sensed by fiber optic sensors 26 positioned along the injector or producer well, or both.

During detection of the incoming steam, voltages differences across the receiver electrodes or coils causes strain in light modulator 44 that is proportional to the signal strength. The strain causes a modulation of the optical phase light traveling along fiber optic cable 46, which is received and processed by optical control system 32 at the surface as an in-well sensor measurement, at block 1004. At block 1006, optical control system 32 then uses the data from the sensor measurements to monitor the level of steam injection and/or to adjust the volume of steam injected by control/adjustment of one or more valves forming part of the steam generator and injection mechanism.

Embodiments and methods of the present disclosure provide many advantages. For example, the present disclosure makes use of the low signal and low power loss characteristics of fiber optic sensors to keep the complex electronics on the surface while leaving only the electronics-free sensors and transmitters downhole. As a result, the system is able to withstand the hostile downhole environment for extended periods of time. Also, the optical-based EM sensors are ideal for deployed permanently behind the casing of injector and/or producer wells. Moreover, the various sensing configurations described herein also provide for optional bucking/direct signal cancellation. Also, the methods may be used in a variety of different SAGD well patterns. The methods can be realized in an intelligent steam monitoring system where the measurements from individual sensors are processed and used as feedbacks to control the valves (and thus the volume) of injected steam at individual injection points. Last, but not least, the proposed intelligent steam monitoring systems support continuous monitoring and automatic optimization of steam volume in the reservoir to maximize the SAGD oil production at a reduced cost.

Methods and embodiments described herein further relate to any one or more of the following paragraphs:

1. An in-well steam monitoring system, comprising an injector well extending along a hydrocarbon-bearing formation to inject steam into the formation surrounding the injector well; a producer well extending along the formation adjacent the injector well to produce hydrocarbons released by the injected steam; one or more fiber optic sensors placed along at least one of the injector or producer wells; and an optical control system communicably coupled to the fiber optic sensors to monitor the injected steam.

2. The system of paragraph 1, wherein the fiber optic sensors comprise a fiber optic cable extending along the injector or producer well and communicably coupled to the optical control system; a strain-responsive light modulator connected to the fiber optic cable; and one or more transmitters or receivers to thereby induce strain in the strain-responsive light modulator.

3. The system of paragraphs 1 or 2, wherein the receivers or transmitters comprise a first and second transmitter electrode positioned axially along the injector or producer well; and a first and second receiver electrode positioned axially between the first and second transmitter electrodes, each of the first and second receiver electrodes being connected to the strain-responsive light modulator.

4. The system of any of paragraphs 1-3, further comprising a bucking electrode placed between the second transmitter electrode and the second receiver electrode.

5. The system of any of paragraphs 1-4, wherein the receivers or transmitters comprise one or more receiver electrodes positioned circumferentially around the injector or producer well and connected to the strain-responsive light modulator; and the strain-responsive light modulator is connected to the injector or producer well.

6. The system of any of paragraphs 1-5, wherein the receivers or transmitters comprise a transmitter coil positioned around the injector or producer well.

7. The system of any of paragraphs 1-6, further comprising a bucking coil positioned between the transmitter coil and the strain-responsive light modulator.

8. The system of any of paragraphs 1-7, wherein the optical control system is communicably coupled to a steam generator to thereby adjust a volume of steam injected into the formation in response to measurements received from the fiber optic sensors.

9. The system of any of paragraphs 1-8, wherein the fiber optic sensors have an electric bi-pole, casing source, or induction coil sensing configuration.

10. The system of any of paragraphs 1-9, wherein the fiber optic sensors a positioned behind a wall of the injector or producer well.

11. An in-well steam monitoring method, comprising injecting steam through an injector well and out into a hydrocarbon-bearing formation, wherein hydrocarbons released by the injected steam are produced through a producer well; receiving in-well sensor measurements from one or more fiber optic sensors positioned along at least one of injector or producer wells; and using the in-well sensor measurements, monitoring the steam injected into the hydrocarbon-bearing formation.

12. The method of paragraph 11, further comprising, in response to the in-well sensor measurements, adjusting a volume of the steam injected into the hydrocarbon-bearing formation.

13. The method of paragraphs 11 or 12, wherein the in-well sensor measurements are received from fiber optic sensors having an electric bi-pole, casing source, or induction coil sensing configuration.

14. The method of any of paragraphs 11-13, wherein receiving in-well sensor measurements comprises in response to a physical perturbation of the formation caused by the steam, inducing a strain in a light modulator connected to a fiber optic cable extending along the injector or producer well; in response to the induced strain, modulating light traveling along the fiber optic cable; and receiving the modulated light at a control system communicably coupled to the fiber optic cable, whereby a corresponding signal is extracted as the in-well sensor measurement.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. An in-well steam monitoring system, comprising:
   an injector well extending along a hydrocarbon-bearing formation to inject steam into the formation surrounding the injector well;
   a producer well extending along the formation adjacent the injector well to produce hydrocarbons released by the injected steam;
   one or more fiber optic sensors placed along at least one of the injector or producer wells, the fiber optic sensors comprising:
      a fiber optic cable extending along the injector or producer well;
      a strain-responsive light modulator connected to the fiber optic cable; and
      one or more transmitters or receivers to thereby induce strain in the strain-responsive light modulator; and
   an optical control system communicably coupled to the fiber optic sensors to monitor the injected steam,
   wherein the receivers or transmitters comprise:
      a first and second transmitter electrode positioned axially along the injector or producer well; and
      a first and second receiver electrode positioned axially between the first and second transmitter electrodes, each of the first and second receiver electrodes being connected to the strain-responsive light modulator.

2. The system of claim 1, further comprising a bucking electrode placed between the second transmitter electrode and the second receiver electrode.

3. The system of claim 1, wherein the optical control system is communicably coupled to a steam generator to thereby adjust a volume of steam injected into the formation in response to measurements received from the fiber optic sensors.

4. The system of claim 1, wherein the fiber optic sensors have an electric bi-pole, casing source, or induction coil sensing configuration.

5. The system of claim 1, wherein the fiber optic sensors are positioned behind a wall of the injector or producer well.

6. An in-well steam monitoring method, comprising:
   injecting steam through an injector well and out into a hydrocarbon-bearing formation, wherein hydrocarbons released by the injected steam are produced through a producer well;
   receiving in-well sensor measurements from one or more fiber optic sensors positioned along at least one of injector or producer wells, the fiber optic sensors comprising:
      a fiber optic cable extending along the injector or producer well;
      a strain-responsive light modulator connected to the fiber optic cable; and
      one or more transmitters or receivers to thereby induce strain in the strain-responsive light modulator, wherein the receivers or transmitters comprise:
         a first and second transmitter electrode positioned axially along the injector or producer well; and
         a first and second receiver electrode positioned axially between the first and second transmitter electrodes, each of the first and second receiver electrodes being connected to the strain-responsive light modulator; and
   using the in-well sensor measurements, monitoring the steam injected into the hydrocarbon-bearing formation.

7. The method of claim 6, further comprising, in response to the in-well sensor measurements, adjusting a volume of the steam injected into the hydrocarbon-bearing formation.

8. The method of claim 6, wherein the in-well sensor measurements are received from fiber optic sensors having an electric bi-pole, casing source, or induction coil sensing configuration.

9. The method of claim 6, wherein receiving in-well sensor measurements comprises:
   in response to a physical perturbation of the formation caused by the steam, inducing a strain in a light modulator connected to a fiber optic cable extending along the injector or producer well;
   in response to the induced strain, modulating light traveling along the fiber optic cable; and
   receiving the modulated light at a control system communicably coupled to the fiber optic cable, whereby a corresponding signal is extracted as the in-well sensor measurement.

10. A non-transitory computer-readable medium comprising instructions which, when executed by at least one processor, causes the processor to perform a method comprising:
   injecting steam through an injector well and out into a hydrocarbon-bearing formation, wherein hydrocarbons released by the injected steam are produced through a producer well;
   receiving in-well sensor measurements from one or more fiber optic sensors positioned along at least one of injector or producer wells, the fiber optic sensors comprising:

a fiber optic cable extending along the injector or producer well;
a strain-responsive light modulator connected to the fiber optic cable; and
one or more transmitters or receivers to thereby induce strain in the strain-responsive light modulator, wherein the receivers or transmitters comprise:
a first and second transmitter electrode positioned axially along the injector or producer well; and
a first and second receiver electrode positioned axially between the first and second transmitter electrodes, each of the first and second receiver electrodes being connected to the strain-responsive light modulator; and
using the in-well sensor measurements, monitoring the steam injected into the hydrocarbon-bearing formation.

11. The computer-readable medium of claim 10, further comprising, in response to the in-well sensor measurements, adjusting a volume of the steam injected into the hydrocarbon-bearing formation.

12. An in-well steam monitoring system, comprising: an injector well extending along a hydrocarbon-bearing formation to inject steam into the formation surrounding the injector well; a producer well extending along the formation adjacent the injector well to produce hydrocarbons released by the injected steam; one or more fiber optic sensors placed along at least one of the injector or producer wells, the fiber optic sensors comprising: a fiber optic cable extending along the injector or producer well; a strain-responsive light modulator connected to the fiber optic cable; and one or more transmitters or receivers to thereby induce strain in the strain-responsive light modulator; and an optical control system communicably coupled to the fiber optic sensors to monitor the injected steam, wherein: the receivers or transmitters comprise two or more receiver electrodes positioned circumferentially around the injector or producer well and connected to the strain-responsive light modulator; and the strain-responsive light modulator is attached to the injector or producer well.

13. The system of claim 12, wherein the optical control system is communicably coupled to a steam generator to thereby adjust a volume of steam injected into the formation in response to measurements received from the fiber optic sensors.

14. The system of claim 12, wherein the fiber optic sensors have an electric bi-pole, casing source, or induction coil sensing configuration.

15. An in-well steam monitoring method, comprising: injecting steam through an injector well and out into a hydrocarbon-bearing formation, wherein hydrocarbons released by the injected steam are produced through a producer well; receiving in-well sensor measurements from one or more fiber optic sensors positioned along at least one of injector or producer wells, the fiber optic sensors comprising: a fiber optic cable extending along the injector or producer well; a strain-responsive light modulator connected to the fiber optic cable; and one or more transmitters or receivers to thereby induce strain in the strain-responsive light modulator, wherein: the receivers or transmitters comprise two or more receiver electrodes positioned circumferentially around the injector or producer well and connected to the strain-responsive light modulator; and the strain-responsive light modulator is attached to the injector or producer well; and using the in-well sensor measurements, monitoring the steam injected into the hydrocarbon-bearing formation.

16. The method of claim 15, further comprising, in response to the in-well sensor measurements, adjusting a volume of the steam injected into the hydrocarbon-bearing formation.

17. The method of claim 15, wherein the in-well sensor measurements are received from fiber optic sensors having an electric bi-pole, casing source, or induction coil sensing configuration.

18. An in-well steam monitoring system, comprising:
an injector well extending along a hydrocarbon-bearing formation to inject steam into the formation surrounding the injector well;
a producer well extending along the formation adjacent the injector well to produce hydrocarbons released by the injected steam;
one or more fiber optic sensors placed along at least one of the injector or producer wells, the fiber optic sensors comprising:
a fiber optic cable extending along the injector or producer well; a strain-responsive light modulator connected to the fiber optic cable; and
one or more transmitters or receivers to thereby induce strain in the strain-responsive light modulator; and
an optical control system communicably coupled to the fiber optic sensors to monitor the injected steam,
the receivers or transmitters comprising a transmitter coil positioned around the injector or producer well and a bucking coil positioned between the transmitter coil and the strain-responsive light modulator, the strain-responsive light modulator being attached to the injector or producer well.

19. An in-well steam monitoring method, comprising:
injecting steam through an injector well and out into a hydrocarbon-bearing formation, wherein hydrocarbons released by the injected steam are produced through a producer well;
receiving in-well sensor measurements from one or more fiber optic sensors positioned along at least one of injector or producer wells, the fiber optic sensors comprising:
a fiber optic cable extending along the injector or producer well;
a strain-responsive light modulator connected to the fiber optic cable; and
one or more transmitters or receivers to thereby induce strain in the strain-responsive light modulator, wherein the receivers or transmitters comprise a transmitter coil positioned around the injector or producer well, the strain-responsive light modulator being attached to the injector or producer well;
using a bucking coil positioned between the transmitter coil and the strain-responsive light modulator to buck a signal; and
using the in-well sensor measurements, monitoring the steam injected into the hydrocarbon-bearing formation.

* * * * *